United States Patent
Lin

[15] 3,673,285
[45] June 27, 1972

[54] PREPARATION OF VINYL ORGANO-PHOSPHOROUS COMPOUNDS

[72] Inventor: Kingso Chingtsung Lin, Newark, Ohio
[73] Assignee: Hooker Chemical Corporation, Niagara Falls, N.Y.
[22] Filed: Nov. 12, 1969
[21] Appl. No.: 876,139

[52] U.S. Cl. .................... 260/970, 260/439 R, 260/439 CY, 260/606.5 P, 260/953, 260/957
[51] Int. Cl. ............................................. C07f 9/28
[58] Field of Search ........................ 260/970, 956, 606.5 P

[56] References Cited

UNITED STATES PATENTS 3,093,672 6/1963 Miller ............................... 260/970 X

OTHER PUBLICATIONS

Cairns et al., " Jour. of American Chem. Soci," Vol. 74, (1952), pp. 5,636–40

Primary Examiner—Joseph Rebold
Assistant Examiner—Anton H. Sutto
Attorney—Peter F. Casella, Donald C. Studley, Richard P. Mueller, James F. Mudd and Richard K. Jackson

[57] ABSTRACT

Compounds containing a P—H bond add to hydrocarbon acetylenic unsaturation in the presence of metal coordinating catalysts selected from Groups VIA and VIII of the Periodic Table, to produce unsaturated organophosphorus compounds in good yields. The unsaturated organophosphorus compounds find utility as intermediates for polymerization reactions in the production of flame resistant polymers.

8 Claims, No Drawings

PREPARATION OF VINYL ORGANO-PHOSPHOROUS COMPOUNDS

BACKGROUND OF THE INVENTION

The preparation of various unsaturated organo-phosphorous derivatives has been accomplished by the addition of phosphines and primary or secondary phosphites to acetylenically unsaturated organic compounds activated by an electron withdrawing group under base catalyzed conditions or to acetylenically unsaturated hydrocarbons via free radical catalysis. As indicated by Pudovik et al., Zhur. Ob. Khim., Vol. 31 (1961), pp. 2,480–2,484, the free radical mechanism is operable if the reaction conditions are controlled to stimulate the addition via a radical mechanism. The yields reported by Pudovik et al. for the addition reaction vary from 20 to 57 percent of theory. The addition via the free radical mechanism was said to be anti-Markownikoff.

BRIEF DESCRIPTION OF THE INVENTION

In accordance with this invention, it has been discovered that compounds containing a P—H bond add readily to acetylenic unsaturation via the formation of an intermediate coordination compound of the P—H ligand or the acetylenic ligand and a metal complexing catalyst selected from the group VIA or VIII of the Periodic Table. In essence, those metals which enter into coordination complexes with acetylenic unsaturation to catalyze the copolymerization or simple polymerization of acetylenic compounds are suitable to use as the catalysts for addition of a reactant containing the P—H linkage to acetylenic compounds.

DETAILED DESCRIPTION OF THE INVENTION

This invention relates to the catalytic addition of compounds containing a phosphorus-hydrogen (P—H) bond to acetylenic (—C≡C—) compounds to produce a phosphorus-carbon bond in a product having olefinic unsaturation

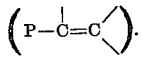

The catalysts found to be effective in the reaction of this invention include salts and complexes of the transition metals which have been employed in the art as the catalysts for the addition and polymerization of acetylenic compounds. The metal salts and their complexes are based upon the metals of Groups VIA and VIII of the Periodic Table. Especially applicable catalysts are the salts of iron, cobalt, nickel, ruthenium, rhodium, palladium, iridium, osmium and platinum, and their complexes. However, chromium, molybdenum and tungsten salts and their complexes may be employed under proper process conditions as the catalysts for the process of this invention.

The ligands which may be used in the metal complex catalyst for this invention include carbonyl, ammonia, alkylamines, arylamines, alkylene diamines, arylnitriles, alkylnitriles, oximes, aldimines, ketimines, arylazo compounds, alkylphosphines, arylphosphines, alkylphosphites, arylphosphites, dialkylformamides, and the like. The ionic ligands which may be used in the metal catalyst for this invention are generally any salt of the transition metals, such as halides, carboxylates, sulfonates, phosphites, phosphates, cyanide, phenolates, thiophenolates, imides, alkylphosphides, acetylacetonates, isocyanates, thiocyanates, cyanates, isothiocyanates, and the like.

The formation of a coordination complex between a transition metal and an acetylenically unsaturated reactant may proceed directly or by substitution of the acetylenically unsaturated ligand for a ligand previously coordinated with the metal. For example, platinum and palladium chloride will enter directly into coordination complexes with acetylene. Chromium, molybdenum, tungsten, iron, cobalt, nickel, osmium and irridium form complexes with acetylenic unsaturation usually when other strongly pi-bonding ligands are present.

It is known that acetylene will enter into various types of coordinated complexes with transition metals (Advances In Organo Metallic Chemistry, Vol. 5, 1967, pp. 114–120). It is believed that the complex formation involved in the instant invention is either of the type in which the acetylene becomes bonded to the metal and is still identifiable as such, with the possible loss of one or more of the original ligand groups of the parent molecule, or the complex is the type obtained during the polymerization of acetylenes.

The transition metal salts and their complexes employed in this invention generally form rather stable complexes with acetylenic ligands and a donor molecule containing the phosphorus atom. Because both acetylenic compounds and compounds containing the P—H bond are capable of acting as ligands in the formation of coordination compounds with transition metal salts, the catalytic species or the reactive intermediate may be regarded as either one or both of the acetylenic compound and the phosphorus compound complexed through coordination bonds with the transition metal atom. As a result of the pi-bonding between the metal atom and the acetylenic unsaturation, the latter molecule becomes very reactive and susceptible to the addition of a molecule containing a nucleophilic atom.

Although applicant does not desire to be bound by any specific reaction mechanism, it is believed that the reaction of a compound containing a P—H bond with acetylenic unsaturation in the presence of a transition metal salt or complex proceeds by any one of the following paths in which M represents the transition metal, L represents a ligand and n is the number of complexed L's:

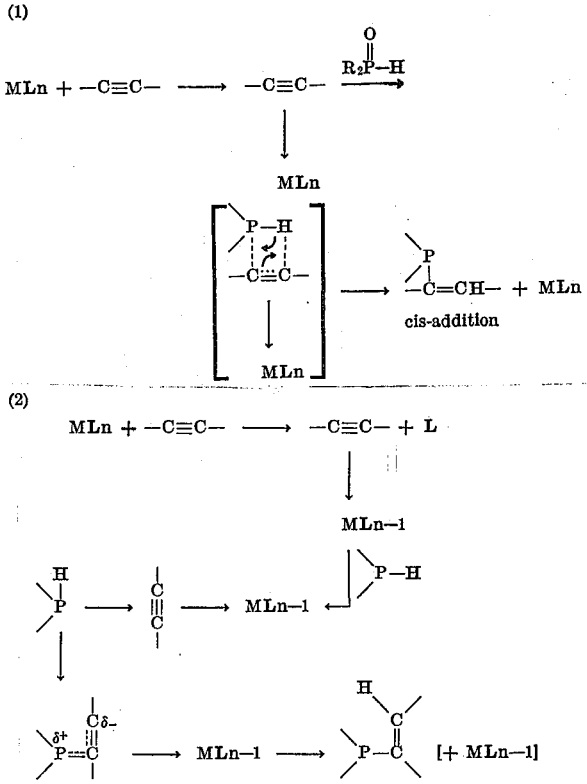

Path 1. represents the formation of a coordination complex and cis-addition. Path 2. illustrates the reaction mechanism which may take place with the displacement of a ligand from the transition metal complex. Path 3. illustrates a reaction mechanism through which the reactant containing the P—H bond enters directly into a coordination complex with the metal atom of the transition metal complex.

The pi-bonding between the acetylenic compound and the transition metal atom is evidenced from the fact that cis-addi- (3)

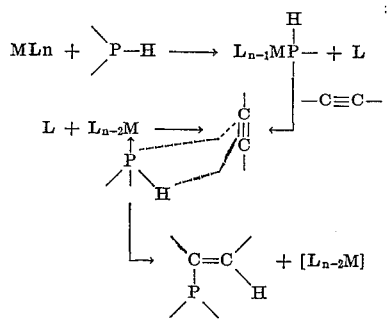

tion occurs. In this sense, the process of the instant invention also presents a technique for stereospecific addition of compounds containing a P—H bond to acetylenic unsaturation catalyzed by transition metal complexes to afford a product predominating in the cis-addition product. However, trans-addition may also occur under certain reaction conditions.

Reactants of the type contemplated in the instant invention which contain a P—H bond are those compounds embraced by the following formula:

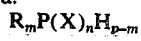

in which R is an alkyl group of one to 18 carbon atoms, alkoxy of one to 18 carbon atoms, or aryl of six to 12 carbon atoms. X is oxygen or sulfur, $m$ is from 0 to 2, $n$ is from 0 to 1 and $p$ is 3.

More specifically, the reactants contemplated by this invention include phosphine, methyl phosphine, ethyl phosphine, propyl phosphine, butyl phosphine, pentyl phosphine, hexyl phosphine, heptyl phosphine, octyl phosphine, the corresponding dialkyl phosphines, the corresponding alkoxy phosphines and diphenyl phosphine as well as the corresponding primary and secondary phosphites and thio phosphites.

The acetylenically unsaturated reactant for the instant invention may be described by the following formula:

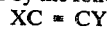

in which X and Y are independently selected from the group consisting of hydrogen, alkyl of one to 18 carbon atoms, phenyl and hydroxy substituted alkyl of one to 18 carbon atoms.

The reaction of a compound containing a P—H bond with an acetylenically unsaturated compound may be conducted in a suitable inert solvent. Representative inert solvents are the lower alkanols such as methanol, ethanol, propanol, etc; hydrocarbons such as alkanes of five to 18 carbon atoms, benzene, toluene, etc.; ethers such as diethyl ether, dioxane, tetrahydrofuran, etc.; nitriles such as acetonitrile, benzonitrile, etc.; esters such as ethyl acetate, etc.; amides such as dimethyl formamide; and the like. The reaction may be conducted in the absence of a solvent by the application of a suitable pressure to prevent the escape of gaseous reactants.

The temperature of reaction varies somewhat with the reactants but generally lies between room temperature and 200° C. Preferably the temperature is between 40° to 180° C. Generally, it is preferred that the reaction be conducted in the presence of an inert atmosphere which may be provided by nitrogen, argon, etc.

The reaction time necessary for a complete reaction will vary somewhat with the reactants, but generally the reaction may be completed within 10 hours. A catalytic amount of the metal complexing agent (0.01 to about 1.0 mole percent) is sufficient to afford a high yield of the addition products. Preferably the amount of the catalyst used is 0.16 to about 0.32 mole percent.

The unsaturated organo-phosphorus compounds resulting from the process of this invention find utility as flame retardant additives for polymers. As such they may be employed in the production of co-polymers with other unsaturated monomers. Furthermore, the products obtained by the process of this invention may be employed as plasticizers or lubricating and hydraulic fluid additives.

The following examples are presented to illustrate various specific embodiments of the instant invention, and are not to be construed as representing a limitation on the scope of the invention.

Reference to the transition metals in Groups VIA and VIII, of the Periodic Table, supra, is based upon those Groups as they appear in the Handbook of Chemistry and Physics, 32nd Edition, 1950–1951, Chemical Rubber Publishing Company. pp. 336–337.

In the following Examples, the abbreviations are g = grams; b.p. = boiling point; mm= millimeters mercury absolute; $n_d^{20}$ = refractive index; p.p.m. = parts per million; n.m.r. = nuclear magnetic resonance and m.p. = melting point. All the values for I.R. analysis are in reciprocal centimeters (cm⁻¹) and all temperatures are in degrees centigrade (° C.).

EXAMPLE I

Attempted Addition of Di-cyclohexylphosphine to 4-Octyne in the Absence of Catalyst at High Temperature.

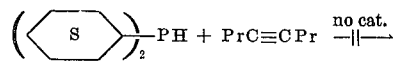

A solution of 6.6 g. (0.06 mole) of 4-octyne and 10 g (0.05 mole) of dicyclohexylphosphine in a three-necked flask was heated at 130° for 6 hours. Distillation of the resulting reaction solution gave only the starting materials. The reaction was repeated by heating at 150° for 6 hours. The result gave only the staring materials.

EXAMPLE II

Addition of Dicyclohexylphosphine to 4-Octyne in the Presence of Dicarbonyldi(triphenylphosphino)Nickel as Catalyst

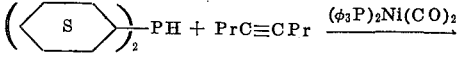

b.p. 105–108/3mm b.p. 131°/760mm

A solution of 6.6 g. (0.06 mole) of 4-octyne, 10 g. (0.05 mole) of dicyclohexylphosphine and 0.5 g. of $(\phi_3P)_2Ni(CO)_2$ in a 50 ml. three- necked flask was refluxed under a nitrogen atmosphere with magnetic stirring for 6 hours. The reaction mixture became reddish brown in color after 2 hours of refluxing and stirring, Distillation of the resulting reaction solution gave:

Fraction I — 1.9 g; b.p. 83°–95°/0.05 mm; dicyclohexylphosphine;

Fraction II — 0.5 g; b.p. 95°–135°/0.05 mm; fore-cut of the Fraction III;

Fraction III — 10.7 g; b.p. 140°~143°/0.1 mm; dicyclhexyl(4-octenyl)phosphine.

2.1 g. of distillation residue.

Redistillation of Fraction III gave 9.2 g; b.p. 129°–131°/0.05 mm; $n_D^{20}$ 1.5185. The IR spectrum of the redistilled product showed absorption at 742 (P—C), 888 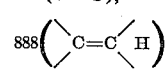

1,405 (—P—C), 1620 (—C = C) and 2,950 with shoulder at 2,990

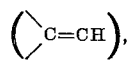, (no —P—H absorption band indicated a tertiary phosphine). The n.m.r. showed a singlet in the vinyl proton region at 7.8 ppm.

Analysis for $C_{20}H_{37}P$:
Calculated: C, 77.86; H, 12 .09; P, 10.05
Found: C, 75.57, 75.53; H, 11.90, 11.68; P, 10.74, 10.88
Flame photometric analysis:
Found: P, 9.80.

The HgCl₂ salt formed from refluxing a mixture of 1 g. of dicyclohexyl(4-octenyl)-phosphine in 10 ml. of tetrahydrofuran and 0.9 g. of HgCl₂ in 10 ml of tetrahydrofuran gave m.p. 225°-227° from ethanol. IR spectrum showed absorption at 735 (P—C),

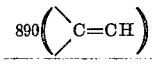

1,463 (P—C) and 1,615 (C = C).

Analysis for C₂₀H₃₇P·HgCl₂:
Calculated: C, 41.41; H, 6.43; P, 5.35;
Found: C, 41.57; H, 6.34; P, 5.47.

EXAMPLE III

Addition of Dicyclohexylphosphine to 1-Octyne Using Dicarbonyldi(triphenylphosphino)Nickel as Catalyst In a 50 ml., three-necked flask equipped with a reflux condenser and a thermometer was placed 10 g. (0.05 mole) of dicyclohexylphosphine and 0.2 g. (33 mole) of dicarbonyldi(triphenylphosphino) nickel. With vigorous stirring, 6.6 g. (0.06 mole) of 1-octyne was added to the above solution. The reaction mixture became light brown color and an exothermic reaction was observed. After heating at 100° for 6 hours, the resulting dark brown solution was distilled to give:

Fraction I — 5.6 g; b.p. 67°-83°/0.05 mm; dicyclohexyl phosphine;

Fraction II — 4.9 g; b.p. 144°-148°/0.05 mm; light greenish yellow liquid.

4.9 g. of distillation residue.

Upon standing at room temperature, colorless crystals deposited from the Fraction II. The IR spectrum of this colorless crystalline material, m.p. 62°-66° showed absorption at 2250 (P—H) and 1,160 (P = O) (identical as the IR spectrum of dicyclhexylphosphine oxide). Apparently the reaction mixture was partially oxidized by air. The filtrate of Fraction II was redistilled to give 120°-122°/0.05 mm; dicyclohexyl(1-octenyl)phosphine. The IR spectrum of this fraction showed absorption at 3,050 (—C = CH), 1,600 (C = C) and 885 (—C=CH).

Analysis for C₂₀H₃₇P:
Calculated: P, 10.05;
Found: P, 9.86.

EXAMPLE IV

Addition of n-butylphosphine to 1-pentyne Using (φ₃P)₂Ni(CO)₂ as Catalyst

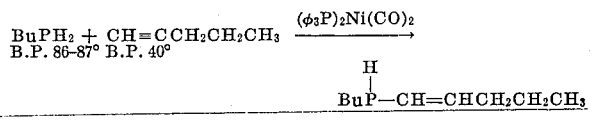

A reaction mixture of 3.4 g (0.05 mole) of 1-pentyne, 4.5 g. (0.05 mole) of BuPH₂ and 0.1 g. of (φ₃P)₂Ni(CO)₂ in a flask was refluxed on an oil bath at 80° for 18 hours. Distillation of the resulting light brown solution gave:

Fraction I — 0.6 g; 40°~41°/760 mm; 1-pentyne;

Fraction II — 0.9 g; b.p. 57°-59°/2.75 mm; BuPH(C₅H₉) and 0.9 g. of distillation residue.

2.8 g. (67 percent) of butylphosphine was recovered from an acetone and dry-ice trap.

The infrared spectrum of Fraction II showed absorption at 3,050 CH), 2,270 (—PH), 1,605 (C = C), 1,465 (P—C) = 894 (C = C).

Analysis for C₉H₁₉P:
Calculated: C, 68.32; H, 12.10; P, 19.58.
Found: C, 68.10; H, 11.90; P, 19.35.

The same reaction was repeated but using an excess of 1-pentyne (3.4 g. (0.05 mole) of 1-pentyne, 2.6 g. (0.03 mole) of n-butylphosphine and 0.1 g. of (φ₃P)₂Ni(CO)₂).

Distillation of the resulting solution gave 0.8 g. of product of b.p. 55°-59°/2.75 mm.; n-C₄H₉PH(C₅H₉); $n_D^{24}$ 1.4704.

EXAMPLE V

Addition of CH₃CH₂CH₂CH₂PH₂ to 4-Octyne Using (φ₃P)₂Ni(CO)₂ as Catalyst

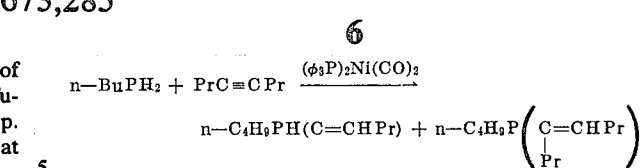

A mixture of 5.5 g. (0.05 mole) of 4-octyne, 4.5 g. (0.05 mole) of n-butylphosphine and 0.1 g. of (φ₃P)₂Ni(CO)₂ in a 50 ml. flask was heated at 50° for 10 hours. The reaction solution was distilled to give 7.3 g. of the starting materials. The recovered material (7.3 g.) and 0.2 g. of (φ₃P)₂Ni(CO)₂ were again heated at 100° for 2 hours and then at 130° for 1 hour. The reaction mixture became dark brown and was allowed to stand overnight and then distilled: 5.4 g. (75 percent) of clear liquid were obtained at 95°-145°/0.05 mm. and 1.2 g. of distillation residue remained. Redistillation of 95°-145°/0.05 mm. fraction gave:

Fraction I — 1.1 g; 62°-95°/0.05 mm. Redistillation afforded at 38°-42°/0.025 mm; $n_D^{20}$ 1.4745; n-butyl(4-octenyl)-phosphine.

Fraction II — 3.6; 99°-101°/0.025 mm; $n_D^{20}$ 1.4869; n-butyldi(4-octenyl) phosphine.

Analysis for fraction I C₁₂H₂₅P:
Calculated: C, 71.95; H, 12.58; P, 15.47;
Found: C, 71.82; H, 12.40; P, 15.29.
Flame photometric analysis:
Found: P, 15.80.
Analysis for fraction II C₂₀H₃₉P:
Calculated C, 77.30; H, 12.66; P, 9.98;
Found: C, 77.17; H, 12.66; P, 9,98
Flame photometric analysis for P gave Found 10.30.

The IR spectrum of Fraction I showed absorption at 2,900 with a shoulder at 2,990 (C = CH), 2,270 (PH), 1,620 (C = C) and 890 (C = C).

The IR spectrum of Fraction II showed absorption at 2,900, a shoulder at 3,000 (C = CH), 1,610 (C = C) and 890 (C = C) but no PH absorption band. The HgCl₂ salt formed from HgCl₂ and Fraction II in tetrahydrofuran and recrystallized from ethanol gave m.p. 86°-87°. (IR, 1,615 sharp absorption band indicating C = C).

Analysis for C₂₀H₃₉Cl₂PHg:
Calculated: C, 41.27; H, 6.75; P, 5.32;
Found: C, 41.24; H, 6.59; P, 5.28.

EXAMPLE VI

Addition of n-BuPH₂ to 1-Octyne Using (φ₃P)₂Ni(CO)₂ as Catalyst

A reaction mixture of 4.5 g. (0.05 mole) of n-BuPH₂, 5.5 g. (0.05 mole) of 1-octyne and 0.1 g. of (φ₃P)₂Ni(CO)₂ in a flask was heated at 70°-80° for 1.5 hour and at 100° for one additional hour. The reaction mixture became brown in color. The fractional distillation gave 0.75 g; b.p. 52°-56°/0.05 mm; $n_D^{20}$ 1.4700; n-butyldi(1-octenyl)phosphine and 0.32 g; b.p. 140°-160°/0.05 mm; $n_D^{20}$ 1.5062; n-butyldi(1-octenyl) phosphine.

EXAMPLE VII

Addition of Di-n-butylphosphine to 1- Octyne Using (φ₃P)₂Ni(CO)₂ as Catalyst

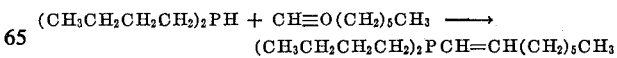

To a solution of 14.6 g. (0.1 mole) of di-n-butylphosphine and 0.2 g. (3.2 × 10⁻⁴ mole) of (φ₃P)₂Ni(CO)₂ was added dropwise 13.5 g. (0.12 mole) of 1-octyne with vigorous stirring under an atmosphere of nitrogen at 145° C. The addition of 1-octyne was completed in an hour. A total of 6 hours of heating at 145° C. was applied to finish the reaction. The resulting reaction solution was distilled to give, 4.2 g. of 1-octyne, 4.3 g. of dibutylphosphine, 16.7 g. (92.5 percent based on di-n-butylphosphine) b.p. 70°~100°2″. Redistillation gave 92°-92.5°/0.06 mm; di-n-butyl-1-octenylphosphine.

The IR spectra identified C═C absorption bands and no P—H bond (indicating a tertiary phosphine).

EXAMPLE VIII

Addition of n-Butylphosphine to 3,6-Dimethyl-4-Octyne-3,6-Diol Using $(\phi_3P)_2Ni(CO)_2$ as Catalyst

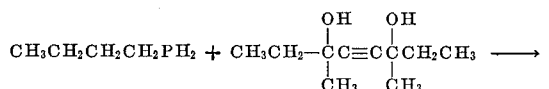

A reaction mixture of 10 g (0.2 mole) of N-butylphosphine, 34 g. (0.2 mole) of 3,6-dimethyl-4-octyne-3,6-diol and 0.2 g. (3.2 × 10⁻⁴ mole) of $(\phi_3P)_2Ni(CO)_2$ in a three-necked flask equipped with a thermometer, a reflux-condenser and a magnetic stirrer was heated at 80° for 1 hour, then at 120° for 8 hours. The color of the reaction mixture became reddish brown. The distillation of the reaction mixture gave:

Fraction I — 9.51 g; b.p. 94°–96°/760mm; (separated into two layers, 4.9 g. of n-butylphosphine and 4.61 g. of water).

Fraction II — 11.0 g; 77°–98°/14 mm unknown product Analysis showed C, 84.10; H, 10.53 and no P.

Fraction III — 5.15 g; b.p. 67°–75°/0.04 mm; light yellow liquid. Redistillation gave: 71°–72°/0.05 mm;

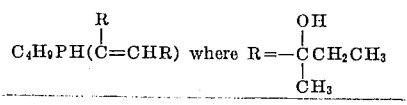

Analysis for $C_{14}H_{29}PO_2$:
Calculated: D, 64.58; H, 11.23; P, 11.90.
Found: C, 64.18; H, 11.04; P, 11.60.

Fraction IV — 15.6 g; b.p. 75°–144°/0.04 mm; Redistillation gave a product boiling at 140°–141°/0.04 mm. Analysis: C, 64.38; H, 10.81; P, 9.22

EXAMPLE IX

Addition of Phenylphosphine to 4-Octyne Using $(\phi_3P)_2Ni(CO)_2$

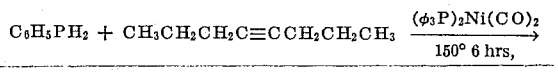

A reaction mixture of 11.4 g. (0.1 mole) of $C_6H_5PH_2$, 11.4 g. (0.1 mole) of 4-octyne and 0.2 (3.2 × 10⁻⁴ mole) of $(\phi_3P)_2Ni(CO)_2$ was heated at 130° for 6 hours. The distillation of 14.4 g. of the reaction solution gave:

Fraction I — 1.8 g; b.p. 31°–92°/75–80 mm; $C_6H_5PH_2$ and 4-octyne.

Fraction II — 10.6 g; (84 percent) b.p. 70°–72°/0.05 mm; redistillation gave b.p. 80°–81°/0.05 mm; $n_D^{25}$ 1.5295;

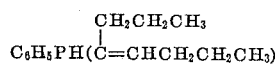

Analysis for $C_{14}H_{21}P$:
Calculated: P, 14.06
Found: P, 14.15

Fraction III — 1.5 g. (10.1 percent); b.p. 110°–135°/1ⁿ; viscous distillate.

IR showed no P—H absorption band but positive identification of a —C═C— band.

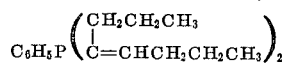

EXAMPLE X

Addition of n-Butylphosphine to Diphenylacetylene Using $(\phi_3P)_{2aq}^{Ni(CO)}{}_2$ as Catalyst

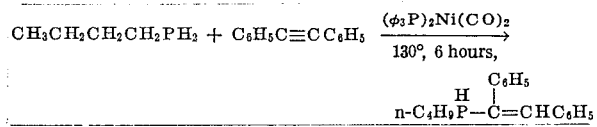

A reaction mixture of 14 g. (0.15 mole) of n-butylphosphine, 27 g. (0.15 mole) of diphenylacetylene and 0.2 g (3.2 × 10⁻⁴ mole) of $(\phi_3P)_2Ni(CO)_2$ was heated over an oil bath at 135° with vigorous stirring. An exothermic reaction was observed. After heating at 135° for 15 minutes, the temperature of the oil bath was maintained at 100° for 4 hours. Distillation of the resulting dark viscous liquid gave:

Fraction I - 3.5 g. (25 percent); b.p. 86°–87°/760 mm; n-butylphosphine.

Fraction II - 12 g. (44 percent); b.p. 101°–108°/0.04 mm; diphenylacetylene.

Fraction III - 5.5 g. of the pot residue (24 g.) was distilled under high vacuum to give 3.5 g. of the distillate. The middle cut of the distillate 155°–173° (coil bath temperature)/1ⁿ was analyzed to give C, 73.23; H, 71.58; P, 10.03. IR spectra indicated the presence of a —P—H absorption band. Therefore calculated for

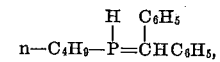

$C_{18}H_{21}P$: C, 80.57; H, 7.88; P, 11.55.

EXAMPLE XI

Addition of $PH_3$ to 5-decyne Using $(\phi_3P)_2Ni(CO)_2$ as the Catalyst

A suspended solution of 50 g. (0.36 mole) of 5-decyne and 0.5 g. of $(\phi_3P)_2Ni(CO)_2$, partially soluble in 5-decyne, was placed in a 300 ml. autoclave. The autoclave was evacuated followed by purging with nitrogen to remove air from the reaction system. Twenty-three grams of $PH_3$ were charged to the autoclave at room temperature. With vigorous stirring the reaction mixture was heated to 160° C. at 810 psig for 10 hours. The pressure did not drop after heating and standing at room temperature overnight. The autoclave was then pressurized with nitrogen to 1,450 psig at 150° C., and continued heating for 10 hours. After standing at room temperature overnight the black solid suspended solution was removed from the autoclave, filtered and distilled to give 5-decyne and a trace of 5-decenylphosphine.

The result of the above reaction indicated that the catalyst used did not dissolve in the solution and partially formed an insoluble $PH_3$ and Ni(CO) complex. The same reaction was repeated using absolute ethanol as the solvent.

One gram of $(\phi_3P)_2Ni(CO)_2$ was dissolved in a solution of 50 g. of 5-cecyne and 100 g. of absolute ethanol. The solution was then placed in a 300 ml. autoclave and charged with 26.10 g. of $PH_3$ at room temperature. The autoclave was heated at 110° C. with vigorous stirring for 8 hours. After standing at room temperature overnight, it was pressurized with nitrogen to 1,200 psig at 100° C., and heating was continued at 100° C. for 8 hours. Distillation of the resulting reaction mixture gave:

Fraction I — 39.57 g; 78°/23 mm; 5-decyne;
Fraction II — 2.92 g; 80°–83°/10 mm; 5-decenylphosphine;
Fraction III — 3.68 g; 130°–133°/0.1 mm; tri(5-decenyl)phosphine.

The IR spectra of Fraction II showed —PH and C═C absorption bands, and cut III gave no —PH absorption band.

EXAMPLE XII

Reaction of Phosphine with 1-heptyne Catalyzed by Ni(II)-THP Complexes

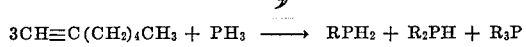

R = heptenyl Major product

A reaction mixture of 0.9 g. of NiCl$_2$·6H$_2$O in 100 g. of ethanol, 1.25 g. of tris(hydroxymethyl)phosphine in 50 ml. of water and 24 g. (0.25 mole) of heptyne-1 in a 500 ml. three-necked flask was introduced 2.8 g. of phosphine with vigorous stirring at room temperature. The reaction temperature increased to 42° C. (an exothermic reaction) after 35 minutes of introduction of phosphine. The addition of phosphine was completed in 1.5 hours. The reaction solution became dark brown from light brown. The solvent was stripped off under reduced pressure to give a dark colored liquid residue. To this oily residue was added 100 ml. of water, followed by extraction with three 200 ml. portions of diethylether and drying over anhydrous sodium sulfate. The solvent ether was removed to give 25 g. of oily residue which was distilled to give 17.7 g (65 percent) of triheptenylphosphine having a b.p. 125°–180°C/0.2 mm. Hg.

Analysis for C$_{21}$H$_{39}$P:
    Calculated: C, 78.21; H, 12.19; P, 9.60.
    Found: C, 78.08; H, 11.85; P, 9.81.

EXAMPLE XIII

Addition of (C$_2$H$_5$O)$_2$P(O)—H to CH$_3$CH$_2$C≡CCH$_2$CH$_2$CH$_3$ using ($\phi_3$P)$_2$Ni(CO)$_2$ as catalyst.

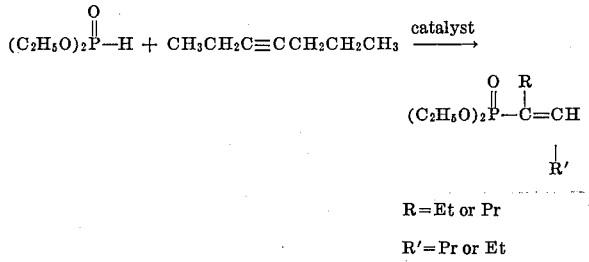

R = Et or Pr
R' = Pr or Et

A. A reaction mixture of 9.6 g. (0.1 mole) of 3-heptyne, 13.6 g. (0.1 mole) of

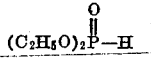

and 0.2 g. of ($\phi_3$P)$_2$Ni(CO)$_2$ in a Fischer Porter pressure bottle was heated at 180° for 5 hours. Pressure was released once at 100° in order to maintain the pressure lower than 50 psig. The distillation of the resulting reaction solution gave.

Fraction I — 20.5 g. of the starting materials (30°–73°/9.0 mm collected in a dry-ice acetone trap)
Fraction II — 1.5 g. (6 percent); 87°–118°/1 mm

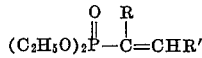

and 0.5 g. of distillation residue.

Analysis for C$_{11}$H$_{23}$PO$_3$
    Calculated: P, 13.23;
Flame Phot. Anal.    Found: P, 12.60

IR spectrum of fraction II showed 1,630 (C=C), 1,250 (P=O) and 1,165 (P—OC$_2$H$_5$).

B. The same reaction was repeated but heated at 200° for 8 hours. The result of heating at a higher temperature and longer time did not increase the conversion.

C. The same reaction using Ni(CO)$_4$ as the catalyst was carried out using 0.3 g. (0.0017 mole) of Ni(CO)$_4$ as the catalyst and heating at 160° for 6.5 hours.

Distillation of the resulting reaction mixture gave:

Fraction I — 6.5 g; b.p. 31°–40°/50~9 mm; 3-heptyne
Fraction II — 10.0 g; b.p. 40°–78°/9 mm;

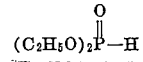

Fraction III — 4.8 g; b.p. 88°–112°/0.5 mm; n$_D^{25}$ 1.4501;

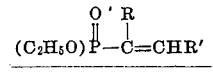

and 1.08 g. of light yellow solid residue.

Redistillation of the Fraction III gave b.p. 69°~72°10.05 mm; N$_D^{25}$ 1.4485. IR spectrum of the redistilled product was identical as the reaction product of Experiment A.

EXAMPLE XIV

Reaction of Dialkyl Phosphate with 4-octyne using Ni(CO)$_4$ as Catalyst

A reaction mixture of 69 g. of

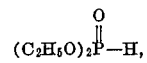

55 g. of 4-octyne and 4.25 g. of Ni(CO)$_4$ was heated at 150° C. for 8 hours. Distillation of the resulting reaction mixture gave 45.1 g.; b.p. 75°–78°/117 mm; 4-octyne, 49.4 g; b.p. 80°–82°/38 mm;

and 18.8 g; b.p. 80°–110°/1~0.25 mm; the corresponding phosphonate.

The same reaction was repeated but heated at 180° for 6 hours to give k19 g. (15.8 percent); b.p. 54°–55°/0.25 mm; unknown product and 89.7 g; b.p. 99°–101°/0.25 mm; diethyl 4-octenylphosphonate.

The IR spectrum of the fraction boiling at 99°–101° C/0.25 mm. was 3,030 cm$^{-1}$

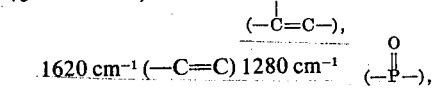

960 cm$^{-1}$ (—C=C—) and no —P—H absorption band at 2,300~2,400 cm$^{-1}$. The $^{31}$P NMR spectrum demonstrated one peak at —26 ppm having J (P—H) = 24 cps which indicated the presence of a cis-addition product,

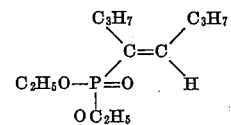

EXAMPLE XV

A reaction mixture of 150 grams

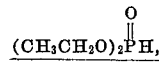

1.7 grams of NiBr$_2$ (anhydrous) and 3.03 grams of tri-n-butyl phosphine in a three-neck flask was gradually heated to about 100° C. and maintained at 100° C. for 10 minutes with vigorous stirring. Acetylene was introduced into the reaction mixture and the temperature increased to 130° C. A sequence of color change followed by an exothermic reaction was observed. The rate of addition of acetylene was controlled by the amount of obsorption in the reaction mixture. After 4 hours of reaction, the product was distilled to give:

Fraction I — 135 grams; boiling point 74°–95° C./18–0.1 mm;

Fraction II — 4.4 grams; boiling point >100° C./0.035 mm; 19.4 grams residue.

Analysis of Fraction I indicated the presence of about 60 percent diethylphosphite and 40 percent diethyl vinylphosphonate.

Redistillation of Fraction I afforded a purified product having a boiling point 140°–142° C./125 mm; $n_D^{25}$ 1.4252 identified as diethyl vinyl phosphonate.

What is claimed is:

1. A process for the production of a compound of the formula:

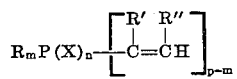

in which R is a member of the group consisting of —H, alkyl of one to 18 carbon atoms, alkoxy of one to 18 carbon atoms, and aryl of six to 12 carbon atoms, R' and R'' are members of the group consisting of —H, alkyl of one to 18 carbon atoms, hydroxyalkyl of one to 18 carbon atoms, and aryl of six to 12 carbon atoms, X is a member of the group consisting of oxygen and sulfur, $m$ is an integer from 0 to 2, $n$ is an integer from 0 to 1, and $p$ is 3, which comprises reacting a compound of the formula:

$$R_mP(X)_nH_{p-m}$$

with an acetylenically unsaturated compound of the formula R'C ≡ CR'' at a temperature between about 20° C. to about 200° C. in the presence of a catalyst selected from the group consisting of dicarbonyl di(triphenylphosphino) nickel, di-(trishydroxymethylphosphino) nickel chloride, di(tri-n-butylphosphino) nickel bromide, and nickel carbonyl.

2. The process of claim 1 in which the temperature of the reaction is from about 40° C. to about 180° C.

3. The process of claim 1 in which $n$ is zero and $m$ is zero.

4. The process of claim 1 in which the catalyst is dicarbonyl-di(triphenylphosphino) nickel.

5. The process of claim 1 in which the catalyst is di-(trishydroxymethylphosphino) nickel chloride.

6. The process of claim 1 in which X is oxygen and R is alkoxy of one to 18 carbon atoms.

7. The process of claim 1 in which the catalyst is di(tri-n-butylphosphino) nickel bromide.

8. The process of claim 1 in which the catalyst is nickel carbonyl.

* * * * *

PO-1050
(5/69)

UNITED STATES PATENT OFFICE
CERTIFICATE OF CORRECTION

Patent No. ___3,673,285___   Dated ___June 27, 1972___

Inventor(s) ___Kingso Chingtsung Lin___

It is certified that error appears in the above-identified patent and that said Letters Patent are hereby corrected as shown below:

Column 4, line 54, column 5, line 35, each occurrence "dicyclhexyl" should read ---dicyclohexyl---. Column 5, line 63, "CH" should read ---(C=CH)--- and "(P-C)=" should read ---(P-C) and---. Column 6, line 76, "100°2'" should read ---100°/2---. Column 7, line 1, "C C" should read ---C=C---; line 76, "-C C-" should read --- -C=C- ---. Column 8, line 7, "$(\phi_3P)_{2aq}Ni(CO)_2$" should read ---$(\phi_3P)_2Ni(CO)_2$---; line 32, "n-$C_4H_9$-P=CH$C_6H_5$" should read ---n-$C_4H_9$-P-C=CH$C_6H_5$ (with H and $C_6H_5$ substituents)---. Column 9, line 30, "≡CCH$_2$CH$_2$CH$_2$" should read ---CCH$_2$CH$_2$CH$_3$---. Column 10, line 12, "72°10.05" should read ---72°/0.05---; line 13, "$N_D$" should read ---$n_D$---; line 36, "k19" should read ---19---.

Signed and sealed this 2nd day of January 1973.

(SEAL)
Attest:

EDWARD M. FLETCHER, JR.
Attesting Officer

ROBERT GOTTSCHALK
Commissioner of Patents